US010790930B2

(12) United States Patent
Chen et al.

(10) Patent No.: US 10,790,930 B2
(45) Date of Patent: Sep. 29, 2020

(54) TECHNIQUES FOR DISTORTION CORRECTION AT A RECEIVER DEVICE

(71) Applicant: QUALCOMM Incorporated, San Diego, CA (US)

(72) Inventors: Jialing Li Chen, San Diego, CA (US); Lin Yang, San Diego, CA (US); Bin Tian, San Diego, CA (US); Ning Zhang, Saratoga, CA (US); Vincent Knowles Jones, IV, Redwood City, CA (US); Didier Johannes Richard Van Nee, Tull en't Waal (NL); Louay Jalloul, San Jose, CA (US); Ahmad Abdulrahman Mohammed, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,301

(22) Filed: Aug. 8, 2018

(65) Prior Publication Data
US 2019/0058545 A1 Feb. 21, 2019

Related U.S. Application Data

(60) Provisional application No. 62/546,377, filed on Aug. 16, 2017.

(51) Int. Cl.
*H04L 1/00* (2006.01)
*H04B 1/10* (2006.01)
(Continued)

(52) U.S. Cl.
CPC ......... *H04L 1/0036* (2013.01); *H04B 1/1036* (2013.01); *H04B 1/406* (2013.01); *H04W 52/0222* (2013.01); *H04W 84/12* (2013.01)

(58) Field of Classification Search
None
See application file for complete search history.

(56) References Cited

U.S. PATENT DOCUMENTS

| 8,279,960 | B2 * | 10/2012 | Kim | H04B 7/0691 375/267 |
| 8,891,390 | B2 * | 11/2014 | Kanzaki | H04B 7/0426 370/252 |

(Continued)

OTHER PUBLICATIONS

Partial International Search Report—PCT/US2018/045913—ISA/EPO—dated Oct. 29, 2018.
(Continued)

*Primary Examiner* — Bunjob Jaroenchonwanit
(74) *Attorney, Agent, or Firm* — Steven R. Thiel (57) ABSTRACT

Apparatuses and methods for correcting a distorted signal at a receiver device during wireless local area network (WLAN) communications are disclosed. The apparatuses and methods include receiving, by a receiver device in a WLAN, a distorted signal corresponding to a data packet signal transmitted from a transmitter device, receiving, by the receiver device, one or more transmitter parameters corresponding to the transmission of the data packet signal, the one or more transmitter parameters including information to adjust the distorted signal, and adjusting, by the receiver device, the distorted signal to reconstruct the data packet signal based at least on the one or more transmitter parameters.

28 Claims, 6 Drawing Sheets

(51) Int. Cl.
*H04B 1/403* (2015.01)
*H04W 52/02* (2009.01)
*H04W 84/12* (2009.01)

(56) References Cited

U.S. PATENT DOCUMENTS

| | | | |
|---|---|---|---|
| 9,729,277 B2* | 8/2017 | Liu | H04L 1/02 |
| 2007/0040704 A1* | 2/2007 | Smee | H04B 1/7107 |
| | | | 340/981 |
| 2008/0292012 A1* | 11/2008 | Kim | H04B 7/0452 |
| | | | 375/260 |
| 2009/0129257 A1* | 5/2009 | Maltsev | H03F 1/0205 |
| | | | 370/208 |
| 2011/0235622 A1* | 9/2011 | Kasher | H04L 5/0023 |
| | | | 370/338 |
| 2013/0272147 A1* | 10/2013 | Vermani | H04B 7/0891 |
| | | | 370/252 |
| 2014/0023092 A1* | 1/2014 | Zhang | H04B 7/0671 |
| | | | 370/474 |
| 2014/0086284 A1* | 3/2014 | Lakhzouri | G01S 5/0273 |
| | | | 375/219 |
| 2014/0140438 A1* | 5/2014 | Silverman | H04B 7/0426 |
| | | | 375/299 |
| 2017/0230805 A1 | 8/2017 | Yamada et al. | |
| 2018/0294997 A1* | 10/2018 | Lee | H04B 7/0452 |
| 2018/0324709 A1* | 11/2018 | Chang | H04W 52/24 |

OTHER PUBLICATIONS

International Search Report and Written Opinion—PCT/US2018/045913—ISA/EPO—dated Jan. 24, 2019.

* cited by examiner

TECHNIQUES FOR DISTORTION CORRECTION AT A RECEIVER DEVICE

CLAIM OF PRIORITY UNDER 35 U.S.C. § 119

The present Application for Patent claims priority to U.S. Provisional Application No. 62/546,377 entitled "TECHNIQUES FOR DISTORTION CORRECTION AT A RECEIVER DEVICE" filed Aug. 16, 2017, which is assigned to the assignee hereof and hereby expressly incorporated by reference herein.

BACKGROUND

Aspects of this disclosure relate generally to telecommunications, and more particularly to techniques for correcting a distorted signal at a receiver device.

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). Nearby BSSs may have overlapping coverage areas and such BSSs may be referred to as overlapping BSSs or OBSSs.

In some WLANs, such as those based on Institute of Electrical and Electronics Engineers (IEEE) 802.11ax, for example, an AP and/or an STA may be configured to engage in a power saving procedure and/or a range extension procedure in order to achieve higher peak throughput, longer range of communication, and/or power efficiency. Such procedures, however, may result in the distortion of signals received by a receiver device (e.g., AP and/or STA) during communications. With the number of STAs communicating with an AP increasing, and with a large number of those STAs having diverse traffic loads, patterns, quality-of-service (QoS) requirements, and conditions, the operations associated with the power saving procedure and/or the range extension procedure may have a significant impact on the QoS of the WLAN. For example, a transmitter device may be configured to transmit a data packet signal. However, due to a number of factors, including power saving and range extension procedures, the transmission of the data packet signal may be distorted. As a result, a distorted signal may be received by a receiver device.

Accordingly, in such scenarios, it may be desirable to correct for the distortion of the received signals by reconstructing a transmitted data packet signal by the receiver device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for correcting a distorted signal at a receiver device for wireless communications is described. The described aspects include receiving, by a receiver device in a wireless local area network (WLAN), a distorted signal corresponding to a data packet signal transmitted from a transmitter device that has increased a transmission power. The described aspects further include receiving, by the receiver device, one or more transmitter parameters corresponding to the transmission of the data packet signal, the one or more transmitter parameters including information to adjust the distorted signal. The described aspects further include adjusting, by the receiver device, the distorted signal to reconstruct the data packet signal based at least on the one or more transmitter parameters.

In an aspect, an apparatus for correcting a distorted signal at a receiver device for wireless communications may include a memory; and at least one processor coupled with the memory and configured to receive, by a receiver device in a WLAN, a distorted signal corresponding to a data packet signal transmitted from a transmitter device that has increased a transmission power. The described aspects further receive, by the receiver device, one or more transmitter parameters corresponding to the transmission of the data packet signal, the one or more transmitter parameters including information to adjust the distorted signal. The described aspects further adjust, by the receiver device, the distorted signal to reconstruct the data packet signal based at least on the one or more transmitter parameters.

In an aspect, a computer-readable medium may store computer executable code for correcting a distorted signal at a receiver device for wireless communications is described. The described aspects include code for receiving, by a receiver device in a WLAN, a distorted signal corresponding to a data packet signal transmitted from a transmitter device that has increased a transmission power. The described aspects further include code for receiving, by the receiver device, one or more transmitter parameters corresponding to the transmission of the data packet signal, the one or more transmitter parameters including information to adjust the distorted signal. The described aspects further include code for adjusting, by the receiver device, the distorted signal to reconstruct the data packet signal based at least on the one or more transmitter parameters.

In an aspect, an apparatus for correcting a distorted signal at a receiver device for wireless communications is described. The described aspects include means for receiving, by a receiver device in a WLAN, a distorted signal corresponding to a data packet signal transmitted from a transmitter device that has increased a transmission power. The described aspects further include means for receiving, by the receiver device, one or more transmitter parameters corresponding to the transmission of the data packet signal, the one or more transmitter parameters including information to adjust the distorted signal. The described aspects further include means for adjusting, by the receiver device, the distorted signal to reconstruct the data packet signal based at least on the one or more transmitter parameters.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The present aspects generally relate to correcting a distorted signal at a receiver device during wireless communications. In an aspect, for example, in some wireless communication networks, wireless stations (STAs) may communicate with one or more access points (APs). For example, either of the STAs and/or the APs may be designated as the receiver device and/or transmitter device. For IEEE 802.11ax, for example, a transmitter device may engage in a power saving procedure and/or a range extension procedure in order to achieve higher peak throughput, longer range of communication, and/or power efficiency. In an example, a power saving procedure may configure a transmitter device to limit/decrease the amount of power used for communication of signals. Moreover, a range extension procedure may cause the extension of the coverage area of a network entity (e.g., an AP) such that the network entity requires more power to transmit signals to remote devices that are situated at a further distance. In these instances, the data packet signal transmitted by the transmitter device may become distorted (i.e., a distorted signal). The receiver device may receive the distorted signal, but not have enough information in order to reconstruct the original data packet signal transmitted by the transmitter device. As such, there is a need to provide transmitter parameters to the receiver device in order to allow the receiver device to reconstruct the data packet signal. Specifically, the receiver device may correct power amplification (PA) non-linearity, allow smaller PA back-off to support larger transmit power, and/or make higher order modulation possible.

Accordingly, in some aspects, the present methods and apparatuses may provide an efficient solution as compared to current solutions, by communicating transmitter parameters that include information for correcting the distorted signal during wireless communications. As such, the present aspects provide one or more mechanisms for receiving, by a receiver device, a distorted signal corresponding to a data packet signal transmitted from a transmitter device. The present aspects further provide for receiving, by the receiver device, one or more transmitter parameters corresponding to the transmission of the data packet signal, the one or more transmitter parameters including information for correcting the distorted signal. The present aspects further include adjusting, by the receiver device, the distorted signal to reconstruct the data packet signal based at least on the one or more transmitter parameters.

Figure 1:
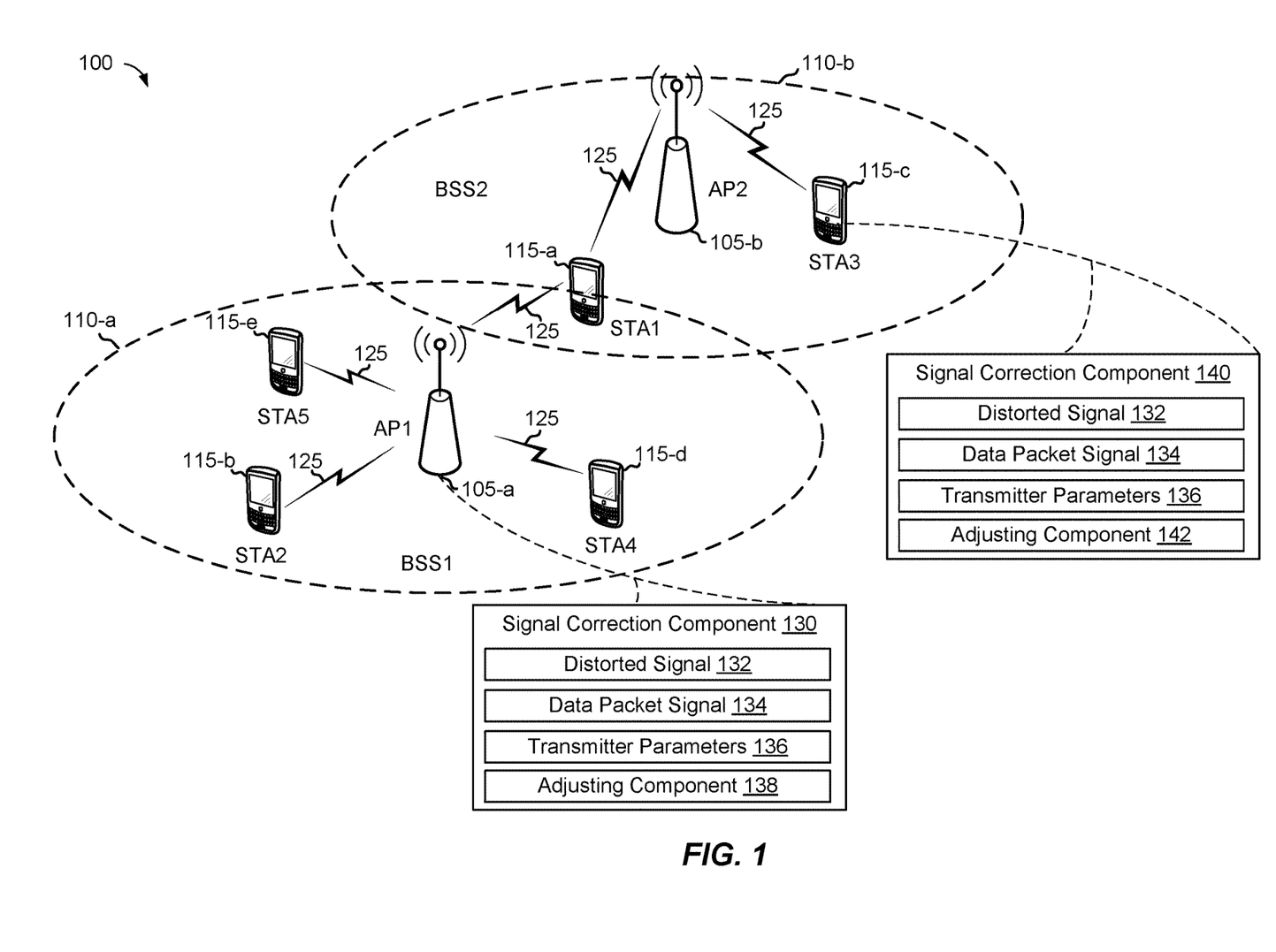
FIG. 1 is a conceptual diagram illustrating an example of a wireless local area network (WLAN) deployment.

FIG. 1 is a wireless communication system 100 illustrating an example of a WLAN deployment in connection with various techniques described herein. The WLAN deployment may include one or more APs comprising a signal correction component, such as signal correction component 130, and one or more STAs associated with a respective AP comprising a signal correction component, such as signal correction component 140. Both signal correction components 130/140 are configured to adjust a distorted signal 132 during wireless communications, as described further below. In an example, STA1 115-*a* may be configured as the receiver device and AP1 105-*a* as the transmitter device. However, it should be noted that the STA1 115-*a* may be configured as the transmitter device and AP1 105-*a* as the receiver device. Nonetheless, STA1 115-*a* may be configured to receive a distorted signal 132 corresponding to a data packet signal 134 transmitted from AP1 105-*a*. STA1 115-*a* may be configured to receive one or more transmitter parameters 136 corresponding to the transmission of the data packet signal 134. The one or more transmitter parameters 136 include information to adjust the distorted signal 132. Further, STA1 115-*a* may be configured to adjust the distorted signal 132 to reconstruct the data packet signal 134 based at least on the one or more transmitter parameters 136. As such, adjusting the distorted signal 132 corrects the distorted signal 132 such that any errors that existed due to the transmission of the data packet signal 134 are resolved.

In this example, there are only two APs deployed for illustrative purposes: AP1 105-a in basic service set 1 (BSS1) and AP2 105-b in BSS2. AP1 105-a is shown having at least two associated STAs (STA1 115-a, STA2 115-b, STA4 115-d, and STA5 115-e) and coverage area 110-a, while AP2 105-b is shown having at least two associated STAs (STA1 115-a and STA3 115-c) and coverage area 110-b. In the example of FIG. 1, the coverage area of AP1 105-a overlaps part of the coverage area of AP2 105-b such that STA1 115-a is within the overlapping portion of the coverage areas. The number of BSSs, APs, and STAs, and the coverage areas of the APs described in connection with the WLAN deployment of FIG. 1 are provided by way of illustration and not of limitation. Moreover, aspects of the various techniques described herein are at least partially based on the example WLAN deployment of FIG. 1 but need not be so limited.

The APs (e.g., AP1 105-a and AP2 105-b) shown in FIG. 1 are generally fixed terminals that provide backhaul services to STAs within its coverage area or region. In some applications, however, the AP may be a mobile or non-fixed terminal. The STAs (e.g., STA1 115-a, STA2 115-b, STA3 115-c, STA4 115-d, and STA5 115-e) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, a small cell, or any other suitable terminology. The various concepts described throughout this disclosure are intended to apply to all suitable wireless apparatus regardless of their specific nomenclature.

Each of STA1 115-a, STA2 115-b, STA3 115-c, STA4 115-d, and STA5 115-e may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs to connect to a network via communications links 125. The APs can send frames to their respective STAs and receive frames from their respective STAs to communicate data and/or control information (e.g., signaling).

Each of AP1 105-a and AP2 105-b can establish a communications link 125 with an STA that is within the coverage area of the AP. Communications links 125 can comprise communications channels that can enable both uplink and downlink communications. When connecting to an AP, an STA can first authenticate itself with the AP and then associate itself with the AP. Once associated, a communications link 125 can be established between the AP and the STA such that the AP and the associated STA can exchange frames or messages through a direct communications channel.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for correcting a distorted signal 132 at a receiver device may be applicable to any suitable wireless network regardless of the coverage range and the wireless access protocols utilized.

Figure 2A:
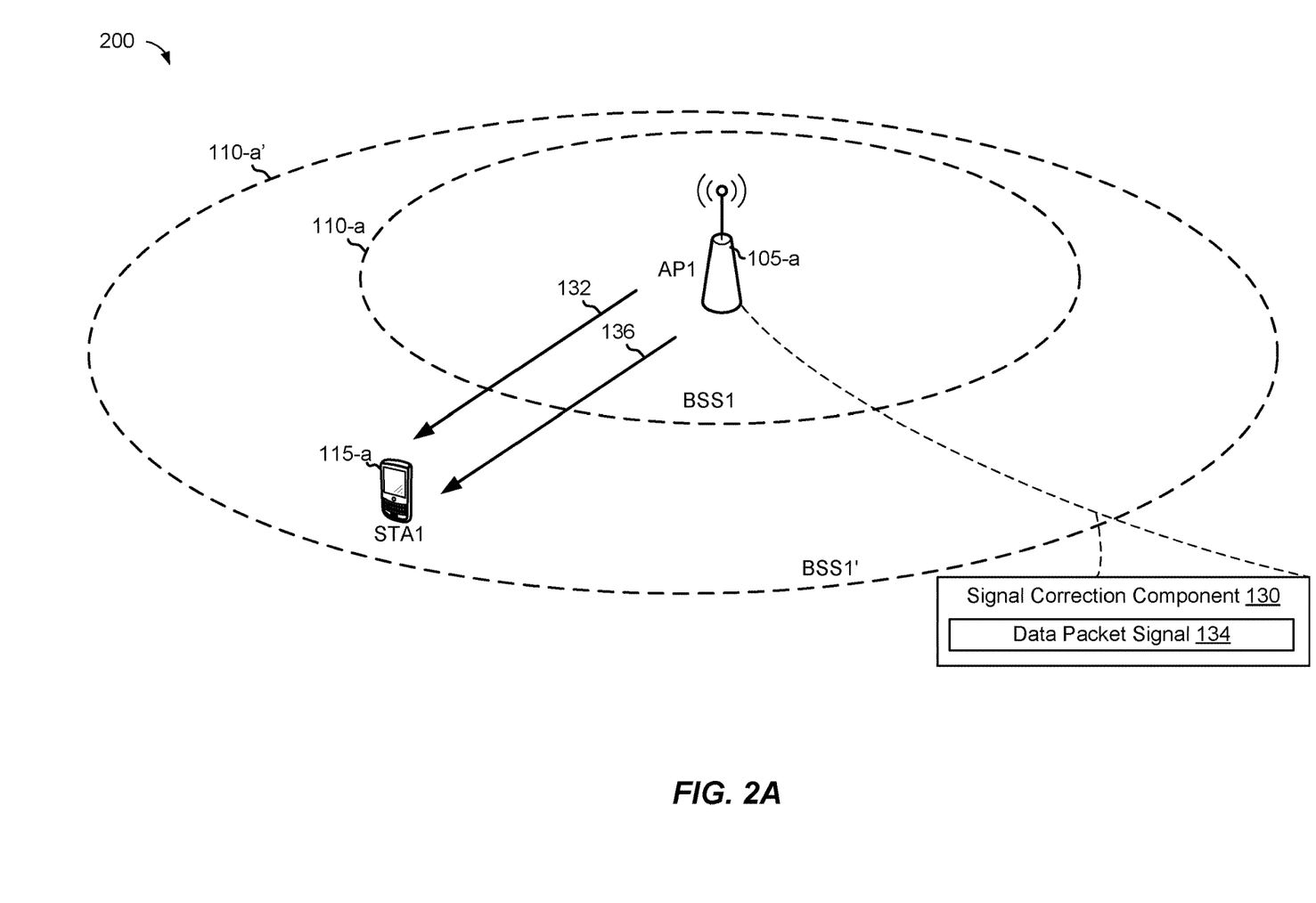
FIGS. 2A and 2B are conceptual diagrams illustrating an example of receiving a distorted signal and transmitter parameters in a WLAN deployment during a range extension of the coverage area.
Figure 2B:
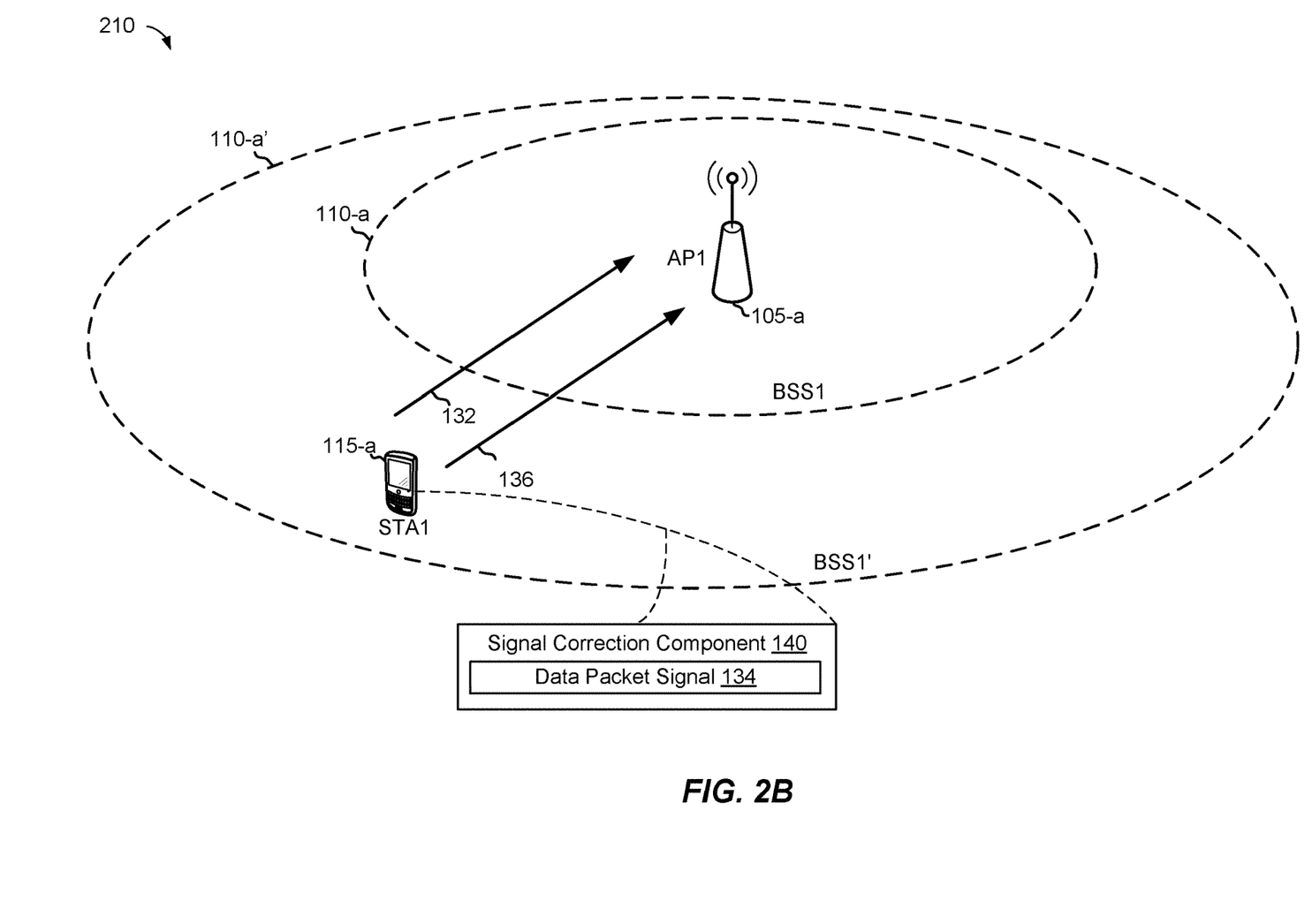

Referring to FIGS. 2A and 2B, conceptual diagrams of example range extension of an access point and subsequent distortion of a data packet signal are described. For example, a data packet signal 134 may be distorted and become a distorted signal 132 due to a number of factors, including, but not limited to, range extension of an AP, such as AP1 105-a. That is, AP1 105-a may extend the range of coverage area 110-a to 110-a' in order to ensure that STA1 115-a is able to communicate with AP1 105-a. As a result of extending to coverage area 110-a', a data packet signal 134 communicated between AP1 105-a and STA1 115-a may become distorted (e.g., distorted signal 132). In an example, the data packet signal 134 may become distorted at the transmitter device or during the transmission of the data packet signal 134 across communication link 125. Therefore, the AP1 105-a and STA1 115-a need to share information in order to correct the distorted signal 132, as described herein. Although scenarios for range extension are shown, it should be noted that a distortion of a data packet signal 134 may be caused be a number of other factors, including but not limited to, power saving procedures, etc.

In an aspect, FIG. 2A depicts a scenario 200 in which AP1 105-a has extended to coverage area 110-a' and STA1 115-a corresponds to a receiver device while AP1 105-a corresponds to a transmitter device. For example, AP1 105-a may transmit a data packet signal 134 to STA1 115-a within coverage area 110-a'. At some point during the transmission of the data packet signal 134, the data packet signal 134 may become distorted due to the range extension of the coverage area. As such, STA1 115-a and/or signal correction component 140 may be configured to receive distorted signal 132 corresponding to the data packet signal 134 transmitted from a STA1 115-a that has increased a transmission power.

In an aspect, STA1 115-a and/or signal correction component 140 may be configured to receive one or more transmitter parameters 136 corresponding to the transmission of the data packet signal 134. For example, the one or more transmitter parameters 136 may be received in at least one of an infrequent message or a frequent message. The infrequent message may correspond to information or parameters that do not change over a certain period of time. Accordingly, the message exchange only needs to be done once after certain period of time rather than once every packet. The frequent message may correspond to information or parameters that change from packet to packet, so a message exchange may need to be done once every packet. That is, each of the infrequent message or the frequent message may include the one or more transmitter parameters 136. In an example, receiving the infrequent message may include receiving the infrequent message during an association process between the STA1 115-a and the AP1 105-a, receiving the infrequent message in response to a transmission of an information request message for the one or more transmitter parameters 136, and/or receiving the infrequent message in response to an indication from AP1 105-a of a change in the one or more transmitter parameters 136. In another example, receiving the frequent message may include receiving the frequent message in a control frame prior from the AP1 105-a prior to transmission of the data packet signal 134. Additionally, in an example, the infrequent message and/or the frequent message may correspond to proprietary messages.

In an aspect, the one or more transmitter parameters 136 include information for a correction of the distorted signal 132. For example, the one or more transmitter parameters 136 include at least one of a number of antennas (Ntx) of the transmitter device used to transmit the data packet signal 134, per-chain cyclic shift delay (CSD) values for data symbols corresponding to the data packet signal 134 transmitted from the transmitter device, a matrix excluding per space-time stream (STS) CSD values and per-chain CSD values for data symbols corresponding to the transmitter device, a net effect value of transmission chain power boosting by the transmitter device, an oversampling ratio, or a net effect value of digital pre-distortion (DPD) power amplification (PA) of the transmitter device.

In an aspect, the one or more transmitter parameters 136 include a number of antennas of the transmitter device used to transmit the data packet signal 134. For example, the number of transmitter device antennas (Ntx) for the transmission of the data packet signal 134 may be needed in signal reconstruction of the transmission chains. The receiver device does not automatically have this information. Instead, the receiver device only knows the number of space-time streams. In an instance, a transmitter device may be configured transit on a maximum of 8 antennas. As such, the transmitter device may be configured to use 3 bits to indicate the number of antennas (e.g., 1-8) used for the transmission of the data packet signal 134. If the maximum number increases over 8 antennas, then the transmitter device may be configured to use more than 3 bits. In an example, the Ntx may be fixed for a long period of time for a given transmitter device.

In an aspect, the one or more transmitter parameters 136 include per-chain CSD values for data symbols of Ntx transmission chains used to transmit the data packet signal 134. For example, the per-chain CSD values for data symbols of Ntx transmission chains for data transmissions (e.g., data packet signal 134) may be needed in signal reconstruction of Ntx transmission chains. These values are transmitter device dependent and need to be transmitted to the receiver device. The per-chain CSD values for data symbols of Ntx that are used in the transmission of the data packet signal 134 may be fed back to the receiver device. In an instance, the per-chain CSD values for data symbols may not change when the Ntx (e.g., the number of transmitter device antennas used in the transmission of the data packet signal 134) is changed. In other instances, the per-chain CSD values for data symbols of the total number of transmitter device antennas may be fed back to the receiver device. In an example, each per-chain CSD value for data symbols may be any value in units, such as but not limited to, nano-seconds (ns). Furthermore, the feedback could be codebook based. Similar to the Ntx, the per-chain CSD values for data symbols may be fixed for a long period of time for a given transmitter device.

In an aspect, the one or more transmitter parameters 136 include a matrix excluding per-STS CSD values and per-chain CSD values for data symbols corresponding to the transmitter device. For example, the open-loop (OL) Q matrix (excluding per-chain CSD values or per-STS CSD values for data symbols of data transmissions) may be a constant matrix across tones. The OL Q matrix may be needed in OL signal reconstruction of Ntx transmission chains. The OL Q matrix is transmitter device dependent. The OL Q matrix of Ntx (currently used in the transmission of the data packet signal 134) may be fed back to receiver device from the transmitter device. The OL Q matrix may be a submatrix inside a Q_max matrix where the number of rows equals the total number of transmission antennas at the transmitter device, and the Q_max matrix includes first Ntx rows when the Ntx (e.g., the number of transmitter device antennas used in the transmission of the data packet signal 134) is changed. Additionally, the OL Q_max matrix may be fed back to receiver device from the transmitter device. Furthermore, the feedback could be codebook based. Alternatively, the OL Q matrix may be quantized and fed back to the receiver device. For example, the transmitter device may use 2 bits to indicate which decomposition applies along with parameters in each quantity. In an example, the decomposition may correspond to:

$$Q=\lambda U, \ Q=U\Lambda, \ \text{or} \ Q=U\Lambda M' \qquad \text{Equation (1)}$$

where U and M are semi-unitary matrices, $\Lambda$ is a real positive diagonal matrix, and $\lambda$ is a real positive scaler. Semi-unitary matrices feedback may be codebook based or quantized using givens rotation (e.g., using angles). Similar to the Ntx, the OL Q matrix may be fixed for a long period of time for a given transmitter device. Moreover, both a null data packet (NDP) (without Q precoding) and a data packet signal (with Q precoding), the OL Q matrix may be estimated at the receiver device.

In another example, the transmission beamforming (TxBF) Q matrix (excluding per-chain CSD values for data symbols or per-STS CSD values for data transmissions) for each tone may be needed in TxBF signal reconstruction of Ntx transmission chains. The feedback of the TxBF Q matrix may be based at least on a V matrix (e.g., Ntx×Ncol, wherein Ncol corresponds to a number of spatial streams a user can support) and a S matrix (e.g., Ncol×Ncol diagonal matrix with real positive diagonal elements) computed using a singular value decomposition (SVD) scheme. The dimensions of the Q matrix depends on the number of space-time streams (Nsts), which is known at receiver device.

For the following feedback options, Nsts may correspond to Ncol. Further, the Q matrix be configured with the first Nsts columns of the following matrices. In a first option, the Q matrix may correspond to the V matrix, and use 1 bit to indicate whether power loading is enabled. For example, in this option, the Q matrix may be calculated using:

$$Q=V\Lambda \qquad \text{Equation (2)}$$

where power loading Λ is a real positive diagonal matrix and feedback power loading parameters, such as diagonal elements in Λ, use codebook or quantized values in dB.

In a second option, one or more bits may be used to indicate the precoding method, such as, 2 bits to indicate the Q matrix. For example, in this option, the Q matrix may be calculated using:

$Q=V$, without power loading      Equation (3)

$Q=V\Lambda$, with power loading Λ (a real positive diagonal matrix)      Equation (4)

$Q=VS^{-1}$, ZF precoding      Equation (5)

$Q=VS(S^2+\gamma I)^{-1}$, MMSE precoding (where γ is a real positive scaler)      Equation (6)

In a third option, one or more bits may be used to indicate the following matrix. For example, in this option, the Q matrix may be calculated using:

$Q=V$ without power loading,      Equation (7)

$Q=V\Lambda$      Equation (8)

where power loading Λ is a real positive diagonal matrix, or more general may be expressed in a decomposition.

If more general, then one or more bits (e.g., 2 bits) may be used to indicate which decomposition applies for the Q matrix followed by parameters in each quantity. For example, in this option, the Q matrix may be calculated using:

$Q=\lambda U$, $Q=U\Lambda$, or $Q=U\Lambda M^*$      Equation (9)

where U and M are semi-unitary matrices, Λ is a real positive diagonal matrix, and λ is a real positive scaler. Semi-unitary matrices may be codebook based or quantized using givens rotation (e.g., using angles).

Similar to the Ntx, the TxBF Q matrix may be exchanged through a control frame prior to transmission of the data packet signal from the transmitter device. Moreover, for both an NDP (without Q precoding) and a data packet signal 134 (with Q precoding), the TxBF Q matrix may be estimated, if the number of antennas of the receiver device (Nrx) equals or exceeds the Ntx.

In an aspect, the one or more transmitter parameters 136 include a net effect value of transmission chain power boosting in each tone by the transmitter device. For example, the net effect value of transmission chain power boosting in tones from distortion in baseband including the digital and analog portions may be needed in transmission signal reconstruction at the receiver device. The net effect value of transmission chain power boosting may include at least one or more transmission characteristics including power compensation for spectral flatness, boosting for some tones, transmission filter, etc. In an instance, the net effect value of transmission chain power boosting may be the same for all transmitter device antennas. The net effect value of transmission chain power boosting may be measured by in-band PSD through product testing equipment. In an example, the 1 bit may be configured to indicate on and/or off, followed by additional information (e.g., type index, tone index, and/or boosting in dB) for each type (resource unit (RU) or tone). The net effect value of transmission chain power boosting may be fed back to the receiver device for the current bandwidth, or for all possible supported bandwidths. Moreover, the feedback of the net effect value of transmission chain power boosting may be based on half of the bandwidth (e.g., tones with positive indices) when assuming symmetry. Additionally, the feedback of the net effect value of transmission chain power boosting may be codebook based or quantized in dB. Similar to the Ntx, the net effect value of transmission chain power boosting may be fixed for a long period of time for a given transmitter device.

In an aspect, the one or more transmitter parameters 136 include an oversampling ratio. For example, the oversampling ratio may be needed in transmission signal reconstruction at the receiver device. The oversampling ratio determines the sampling rate of the data packet signal that passed through DPD PA. In an instance, the oversampling ratio is blind to the receiver device and may be bandwidth dependent. In an example, there may be one oversampling ratio per bandwidth. The oversampling ratio may be fed back to the receiver device for the current bandwidth, or for all possible supported bandwidths. Additionally, the feedback of the oversampling ratio may be codebook based or quantized using a few bits (e.g., 6 bits). Similar to the Ntx, the oversampling ratio may be fixed for a long period of time for a given transmitter device.

In an aspect, the one or more transmitter parameters 136 include a net effect value of DPD PA of the transmitter device. For example, the net effect value of DPD PA may be needed in transmission signal reconstruction at the receiver device. The net effect value of DPD PA includes clipping, DPD, and PA modelling. In an example, 1 bit may be used to indicate if clipping is on and/or off. Moreover, additional bits may be used to indicate whether clipping is on and/or off, and the type of clipping, along with more additional bits for indicating the clipping level in dB. In some instances, the number of bits depends on the range of the level. The feedback of the DPD PA may occur based on a number of options. In a first option, if the transmitter device and the receiver device have pre-defined after-DPD PA characteristics (e.g., amplitude-to-amplitude modulation (AM-AM) and amplitude-to-phase modulation (AM-PM) response), then a single (1) bit is used to indicate the feedback followed by the input power back off (IBO) parameter. Additionally, in some instances, the IBO parameter is not fed back but estimated at the receiver device. In a second option, lookup tables (LUTs) are used to indicate after-DPD PA characteristics (e.g., AM-AM and AM-PM response) followed by the IBO parameter (if not included in the responses). Additionally, in some instances, the IBO parameter is not fed back but estimated at receiver device.

In an example, if the net effect value of DPD PA is based on pre-defined or relatively stable characteristic, it may be exchanged through infrequent message. However, if the net effect value of DPD PA is more frequently changed, the net effect value of DPD PA may be exchanged through a control frame prior to data packet signal 134 transmission or with a certain frequency (e.g., every few data packets). Moreover, the DPD PA model may be estimated at the receiver device with or without knowledge of the input power back off (IBO) setting based on signal field (SIG) symbols and/or training symbols. In the instance when the net effect value of DPD PA is based on pre-defined or relatively stable characteristics, the DPD PA model may be calibrated at the receiver device.

For a given DPD PA model, the linear PA gain α may be defined by:

$PA(x)=\alpha x+d$      Equation (10)

wherein the input x and distortion d are uncorrelated. Even though the PA may change over time, the DPD may cause the DPD PA to have a relatively stable linear PA gain α.

Moreover, since α is related to signal magnitude distribution, it may be measured using a signal magnitude distribution. Additionally, the linear PA gain is IBO dependent.

If the DPD PA model is relatively stable, it could be fed back through infrequent messages. Each value (according to an IBO) may be fed back to the receiver device using a lookup table with sufficient density. In another example, a number of bits (e.g., 6 or 8) may be used to feedback a quantized value for each IBO. If the DPD PA model changes over time, the linear PA gain may be fed back to the receiver device more frequently, e.g., in a control frame prior to the data packet signal 134 transmission, and may be only for the IBO in use. Alternatively, the linear PA gain may be calculated at the receiver based on DPD PA model (estimated or signaled) and IBO (estimated or signaled). Similar to the Ntx, the linear PA gain may be fixed for a long period of time for a given transmitter device.

In an aspect, the STA1 115-*a* and/or signal correction component 140 may execute adjusting component 142 to adjust the distorted signal 132 to reconstruct the data packet signal 134 based at least on the one or more transmitter parameters 136. For example, the receiver device, e.g., the STA1 115-*a*, may use the one or more transmitter parameters 136, which include at least one of a number of antennas of the transmitter device used to transmit the data packet signal 134, per-chain CSD values for data symbols corresponding to the transmitter device, a matrix excluding per-STS CSD values and per-chain CSD values for data symbols corresponding to the transmitter device, a net effect value of transmission chain power boosting by the transmitter device, an oversampling ratio, or a net effect value of DPD PA of the transmitter device, to reconstruct the data packet signal 134 from the distorted signal 132.

In another aspect, FIG. 2B depicts a scenario 210 in which AP1 105-*a* has extended to coverage area 110-*a*' and STA1 115-*a* corresponds to the transmitter device while AP1 105-*a* corresponds to the receiver device. The API 105-*a* may be configured as the receiver device and perform the same or similar functions to the corresponding STA1 115-*a* designated as the receiver device in FIG. 2-1, as described above, but configured or otherwise programmed for AP operations as opposed to STA operations.

Figure 3:
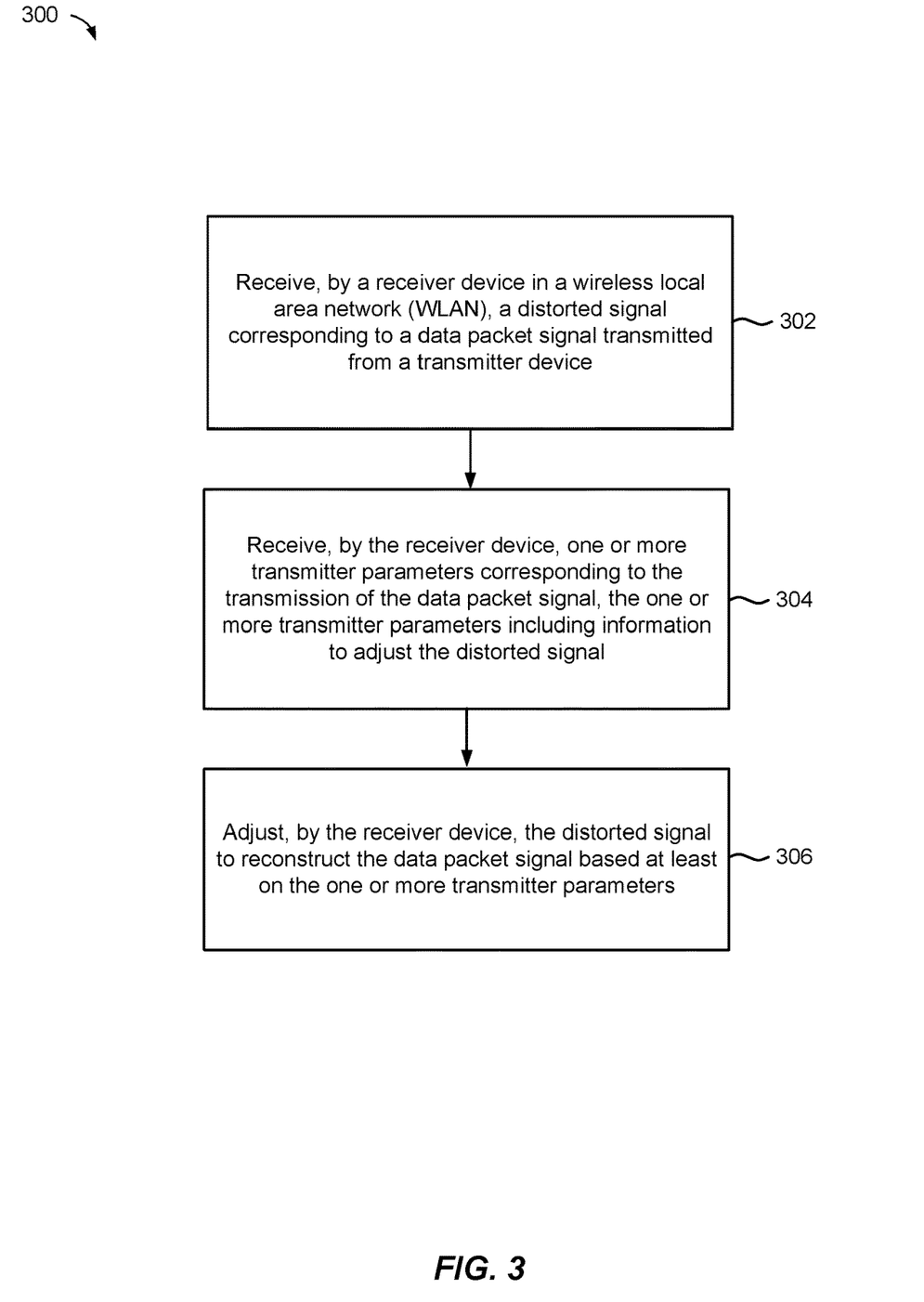
FIG. 3 is a flow diagram illustrating an example method of correcting a distorted signal at a receiver device during wireless communications in accordance with various aspects of the present disclosure.

Referring to FIG. 3, an example of one or more operations of an aspect of signal correction component 130/140 (FIG. 1) according to the present apparatuses and methods are described with reference to one or more methods and one or more components that may separately schedule and group multiple users during wireless communications. Although the operations described below are presented in a particular order and/or as being performed by an example component, it should be understood that the ordering of the actions and the components performing the actions may be varied, depending on the implementation. Also, although the signal correction component 130/140 is illustrated as having a number of subcomponents, it should be understood that one or more of the illustrated subcomponent may be separate from, but in communication with, the signal correction component 130/140 and/or each other. Moreover, it should be understood that the following actions or components described with respect to the signal correction component 130/140 and/or its subcomponents may be performed by a specially-programmed processor, a processor executing specially-programmed software or computer-readable media, or by any other combination of a hardware component and/or a software component specially configured for performing the described actions or components.

Although the method 300 describes STA1 115-*a* as the receiver device and AP1 105-*a* as the transmitter device, it should be noted that STA1 115-*a* may be designated as the transmitter device and AP1 105-*a* as the receiver device. In another example, the receiver device and the transmitter device may be any combination of the RF front end, the transceiver, the processors, the modem, and/or the modem components and/or sub-components, as described herein in FIGS. 4 and 5.

In an aspect, at block 302, method 300 includes receiving, by a receiver device in a wireless location area network (WLAN), a distorted signal corresponding to a data packet signal transmitted from a transmitter device. In an aspect, for example, STA1 115-*a* may execute signal correction component 140 to receive, in a WLAN, a distorted signal 132 corresponding to a data packet signal 134 transmitted from a transmitter device (e.g., AP1 105-*a*).

In an aspect, at block 304, method 300 includes receiving, by the receiver device, one or more transmitter parameters corresponding to the transmission of the data packet signal, the one or more transmitter parameters including information to adjust the distorted signal. In an aspect, for example, STA1 115-*a* may execute signal correction component 140 to receive one or more transmitter parameters 136 corresponding to the transmission of the data packet signal 134, the one or more transmitter parameters 136 including information to adjust the distorted signal 132.

Additionally, method 300 includes wherein receiving the one or more transmitter parameters 136 further comprises receiving at least one of an infrequent message or a frequent message. Method 300 further includes wherein receiving the infrequent message further comprises receiving the infrequent message during an association process between the receiver device and the transmitter device (e.g., AP1 105-*a*). Method 300 further includes wherein receiving the infrequent message further comprises receiving the infrequent message in response to a transmission of an information request message for the one or more transmitter parameters 136. Method 300 further includes wherein receiving the infrequent message further comprises receiving the infrequent message in response to an indication from the transmitter device (e.g., AP1 105-*a*) of a change in the one or more transmitter parameters 136. Method 300 further includes wherein receiving the frequent message further comprises receiving the frequent message in a control frame prior from the transmitter device (e.g., AP1 105-*a*) prior to transmission of the data packet signal 134.

In an example, the one or more transmitter parameters 136 include at least one of a number of antennas of the transmitter device (e.g., AP1 105-*a*) used to transmit the data packet signal 134, per-chain CSD values for data symbols corresponding to the transmitter device (e.g., AP1 105-*a*), a matrix excluding per-STS CSD values and per-chain CSD values for data symbols corresponding to the transmitter device (e.g., AP1 105-*a*), a net effect value of transmission chain power boosting by the transmitter device, an oversampling ratio, or a net effect value of DPD PA of the transmitter device (e.g., AP1 105-*a*).

In an aspect, at block 306, method 300 includes adjusting, by the receiver device, the distorted signal to reconstruct the data packet signal based at least on the one or more transmitter parameters. In an aspect, for example, STA1 115-*a* may execute signal correction component 140 and/or adjusting component 142 to adjust the distorted signal 132 to reconstruct the data packet signal 134 based at least on the one or more transmitter parameters 136.

Figure 4:
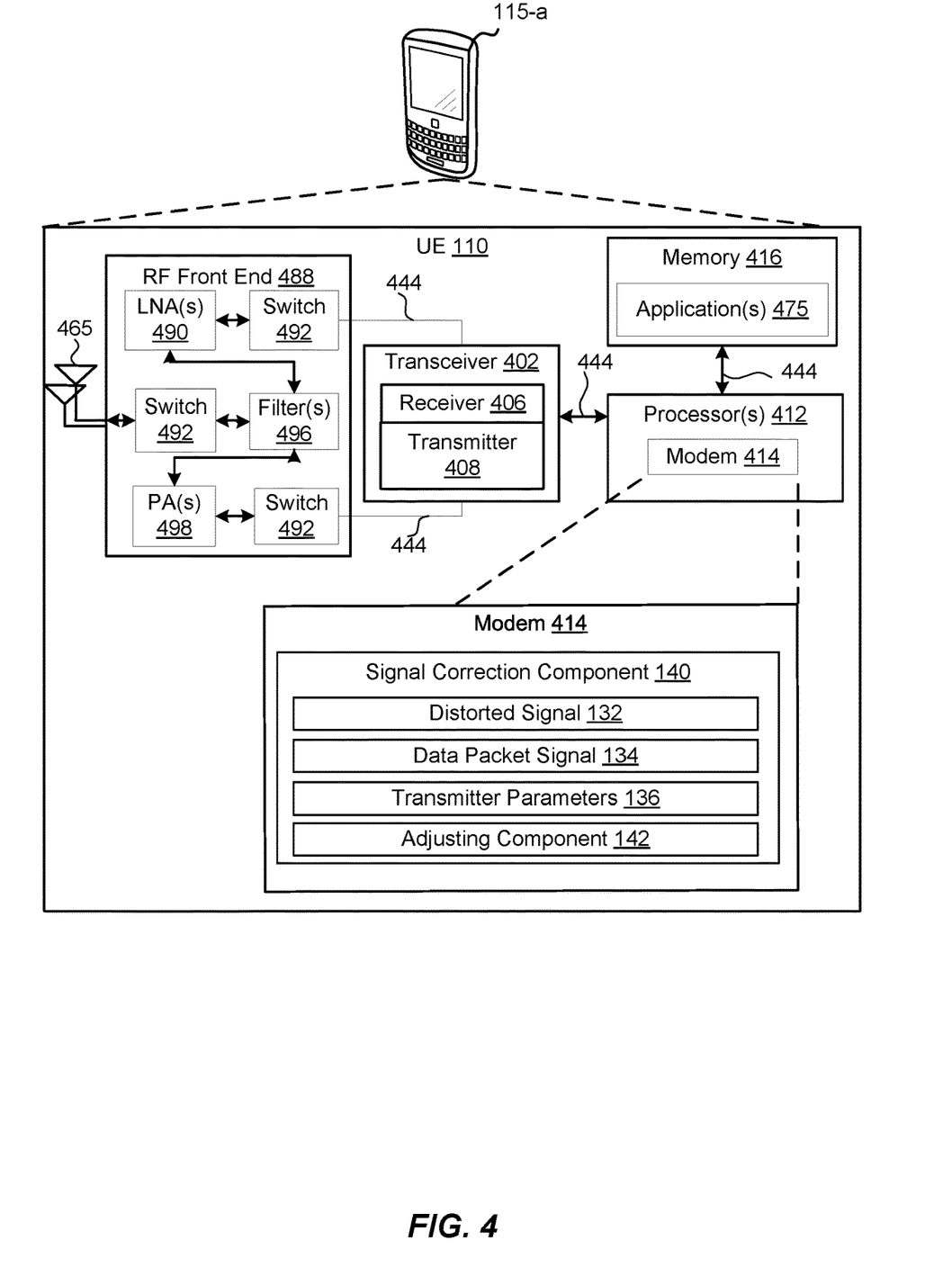
FIG. 4 is a schematic diagram of example components of the wireless station (STA) of FIG. 1.

Referring to FIG. 4, one example of an implementation of an STA1 115-*a* may include a variety of components, some of which have already been described above, but including components such as one or more processors 412 and memory 416 and transceiver 402 in communication via one or more buses 444, which may operate in conjunction with modem 414 and signal correction component 140 to enable one or more of the functions described herein related to the correction of a distorted signal in a WLAN deployment. Further, the one or more processors 412, modem 414, memory 416, transceiver 402, radio frequency (RF) front end 488 and one or more antennas 465, may be configured to support voice and/or data calls (simultaneously or non-simultaneously) in one or more radio access technologies.

In an aspect, the one or more processors 412 can include a modem 414 that uses one or more modem processors. The various functions related to signal correction component 140 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with uplink control management component 150 may be performed by transceiver 402.

Also, memory 416 may be configured to store data used herein and/or local versions of applications 475 or uplink control management component 150 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining uplink control management component 150 and/or one or more of its subcomponents, and/or data associated therewith, when STA1 115-*a* is operating at least one processor 412 to execute signal correction component 140 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a RF receiver. In an aspect, receiver 406 may receive signals transmitted by at least one AP1 105-*a*. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may include, but is not limited to, an RF transmitter.

Moreover, in an aspect, the STA1 115-A may include RF front end 488, which may operate in communication with one or more antennas 465 and transceiver 402 for receiving and transmitting radio transmissions, for example, wireless communications transmitted by at least one AP1 105-*a* or wireless transmissions transmitted by the STA1 115-*a*. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, the RF front end 488 may use one or more switches 492 to select a particular PA 498 and a corresponding specified gain value based on a desired gain value for a particular application. In an example, the one or more PA(s) 498 may cause distortion of a data packet signal 134 during transmission.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that the STA1 115-*a* can communicate with, for example, one or more base stations 105 or one or more cells associated with one or more base stations 105. In an aspect, for example, modem 414 can configure transceiver 402 to operate at a specified frequency and power level based on the STA configuration of the STA1 115-*a* and the communication protocol used by modem 414.

In an aspect, modem 414 can be a multiband-multimode modem, which can process digital data and communicate with transceiver 402 such that the digital data is sent and received using transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of the STA1 115-*a* (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on STA configuration information associated with the STA1 115-A as provided by the network during cell selection and/or cell reselection.

Figure 5:
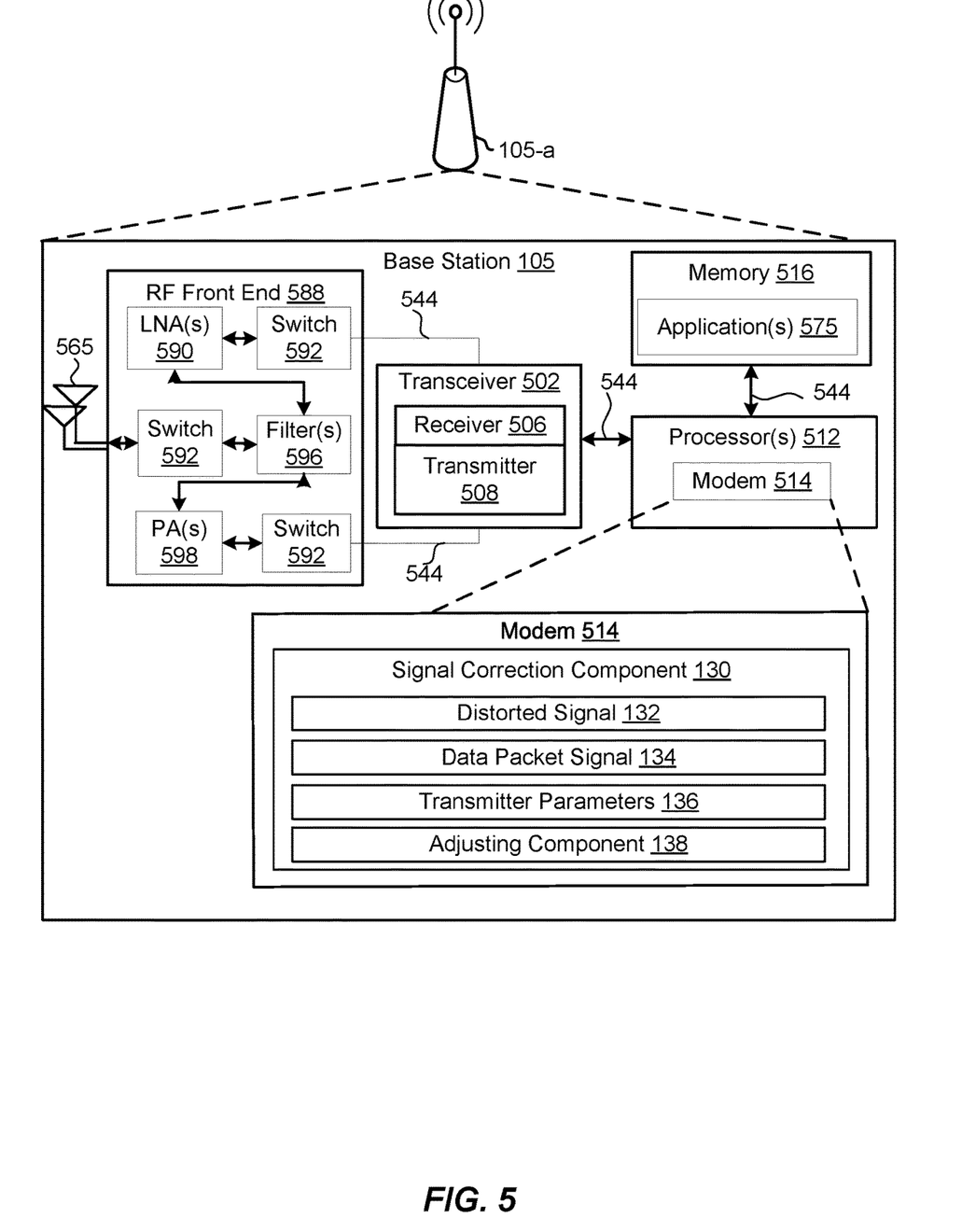
FIG. 5 is a schematic diagram of example components of the access point (AP) of FIG. 1.

Referring to FIG. 5, one example of an implementation of AP1 105-*a* may include a variety of components, some of which have already been described above, but including components such as one or more processors 512, a memory 516, and a transceiver 502 in communication via one or more buses 544, which may operate in conjunction with modem 514 and signal correction component 130 to enable one or more of the functions described herein relating to the correction of distorted signals in a WLAN deployment.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of STA1 115-*a*, as described above, but configured or otherwise programmed for AP operations as opposed to STA operations.

Various processes described herein, such as the processes shown in the method of FIG. 3, may be controlled by a processing unit such as a central processing unit (CPU), a controller, a field-programmable gate array (FPGA) device, an application-specific integrated circuit (ASIC), another hardware device, firmware device, or any combination thereof. As an example, the method 300 of FIG. 3 can be performed by one or more processors that execute instructions to correct a distorted signal. Moreover, in particular aspects, the features associated with the method 300 may be performed in a different order than the order shown in FIG. 3.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication, comprising:
receiving, by a receiver device in a wireless local area network (WLAN) from a transmitter device, a distorted signal corresponding to a data packet signal transmitted;
receiving, by the receiver device from the transmitter device in an infrequent message, one or more transmitter parameters corresponding to transmission of the data packet signal, the one or more transmitter parameters including information corresponding to the transmission of the data packet signal transmitted by the transmitter device for correcting the distorted signal, wherein the one or more transmitter parameters included in the infrequent message do not change for a period of time; and
adjusting, by the receiver device, the distorted signal to reconstruct the data packet signal based at least on the one or more transmitter parameters.

2. The method of claim 1, wherein receiving the infrequent message further comprises receiving the infrequent message during an association process between the receiver device and the transmitter device.

3. The method of claim 1, wherein receiving the infrequent message further comprises receiving the infrequent message in response to a transmission of an information request message from the receiver device to the transmitter device for the one or more transmitter parameters.

4. The method of claim 1, wherein receiving the infrequent message further comprises receiving the infrequent message from the transmitter device as an indication of a change in the one or more transmitter parameters.

5. The method of claim 1, wherein receiving the one or more transmitter parameters further comprises receiving the one or more transmitter parameters in a frequent message.

6. The method of claim 5, wherein receiving the frequent message further comprises receiving the frequent message in a control frame from the transmitter device prior to transmission of the data packet signal.

7. The method of claim 1, wherein the one or more transmitter parameters include a number of antennas of the transmitter device used to transmit the data packet signal.

8. The method of claim 1, wherein the one or more transmitter parameters include per-chain cyclic shift delay (CSD) values for data symbols corresponding to the data packet signal transmitted from the transmitter device.

9. The method of claim 1, wherein the one or more transmitter parameters include a matrix excluding per space-time stream (STS) CSD values and per-chain CSD values for data symbols corresponding to the transmitter device.

10. The method of claim 1, wherein the one or more transmitter parameters include a net effect value of transmission chain power boosting in each tone by the transmitter device.

11. The method of claim 1, wherein the one or more transmitter parameters include an oversampling ratio.

12. The method of claim 1, wherein the one or more transmitter parameters include a net effect value of digital pre-distortion (DPD) power amplification (PA) of the transmitter device.

13. The method of claim 1, wherein the receiver device corresponds to a wireless station (STA) and the transmitter device corresponds to an access point (AP).

14. The method of claim 1, wherein the receiver device corresponds to an AP and the transmitter device corresponds to an STA.

15. The method of claim 1, wherein the data packet signal is distorted to result in the distorted signal in connection with at least one of a power saving procedure or a range extension procedure.

16. An apparatus, comprising:
a memory; and
a processor in communication with the memory, wherein the processor is configured to:
receive, by a receiver device in a wireless local area network (WLAN) from a transmitter device, a distorted signal corresponding to a data packet signal transmitted from a transmitter device;
receive, by the receiver device from the transmitter device in an infrequent message, one or more transmitter parameters corresponding to transmission of the data packet signal, the one or more transmitter parameters including information corresponding to the transmission of the data packet signal transmitted by the transmitter device for correcting the distorted signal, wherein the one or more transmitter parameters included in the infrequent message do not change for a period of time; and
adjust, by the receiver device, the distorted signal to reconstruct the data packet signal based at least on the one or more transmitter parameters.

17. The apparatus of claim 16, wherein the processor configured to receive the infrequent message is further configured to receive the infrequent message during an association process between the receiver device and the transmitter device.

18. The apparatus of claim 16, wherein the processor configured to receive the infrequent message is further configured to receive the infrequent message in response to a transmission of an information request message from the receiver device to the transmitter device for the one or more transmitter parameters.

19. The apparatus of claim 16, wherein the processor configured to receive the infrequent message is further configured to receive the infrequent message from the transmitter device as an indication of a change in the one or more transmitter parameters.

20. The apparatus of claim 16, wherein the processor configured to receive the one or more transmitter parameters is further configured to receive the one or more transmitter parameters in a frequent message.

21. The apparatus of claim 20, wherein the processor configured to receive the frequent message is further configured to receive the frequent message in a control frame from the transmitter device prior to transmission of the data packet signal.

22. The apparatus of claim 16, wherein the one or more transmitter parameters include a number of antennas of the transmitter device used to transmit the data packet signal.

23. The apparatus of claim 16, wherein the one or more transmitter parameters include at least one of per-chain cyclic shift delay (CSD) values for data symbols corresponding to the data packet signal transmitted from the transmitter device, a matrix excluding per space-time stream (STS) CSD values and per-chain CSD values for data symbols corresponding to the transmitter device, a net effect value of transmission chain power boosting in each tone by the transmitter device, an oversampling ratio, or a net effect value of digital pre-distortion (DPD) power amplification (PA) of the transmitter device.

24. The apparatus of claim 16, wherein the receiver device corresponds to a wireless station (STA) and the transmitter device corresponds to an access point (AP).

25. The apparatus of claim 16, wherein the receiver device corresponds to an AP and the transmitter device corresponds to an STA.

26. The apparatus of claim 16, wherein the data packet signal is distorted to result in the distorted signal in connection with at least one of a power saving procedure or a range extension procedure.

27. An apparatus, comprising:
means for receiving, in a wireless local area network (WLAN) from a transmitter device, a distorted signal corresponding to a data packet signal transmitted from a transmitter device;
means for receiving, from a transmitter device in an infrequent message, one or more transmitter parameters corresponding to transmission of the data packet signal, the one or more transmitter parameters including information corresponding to the transmission of the data packet signal transmitted by the transmitter device for correcting the distorted signal, wherein the one or more transmitter parameters included in the infrequent message do not change for a period of time; and
means for adjusting the distorted signal to reconstruct the data packet signal based at least on the one or more transmitter parameters.

28. A non-transitory computer-readable medium storing computer code executable by a processor for wireless communications, comprising:

code for receiving, by a receiver device in a wireless local area network (WLAN) from a transmitter device, a distorted signal corresponding to a data packet signal transmitted from a transmitter device;

code for receiving, by the receiver device from a transmitter device in an infrequent message, one or more transmitter parameters corresponding to transmission of the data packet signal, the one or more transmitter parameters including information corresponding to the transmission of the data packet signal transmitted by the transmitter device for correcting the distorted signal, wherein the one or more transmitter parameters included in the infrequent message do not change for a period of time; and code for adjusting, by the receiver device, the distorted signal to reconstruct the data packet signal based at least on the one or more transmitter parameters.

* * * * *